US008608238B2

(12) United States Patent
Tanaka et al.

(10) Patent No.: US 8,608,238 B2
(45) Date of Patent: Dec. 17, 2013

(54) VEHICLE BODY STRUCTURE FOR AUTOMOBILE (75) Inventors: Hirofumi Tanaka, Wako (JP); Satoru Yamaguchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/557,330

(22) Filed: Jul. 25, 2012

(65) Prior Publication Data

US 2013/0033072 A1 Feb. 7, 2013

(30) Foreign Application Priority Data

Aug. 6, 2011 (JP) ................................. 2011-172442

(51) Int. Cl.
*B62D 25/16* (2006.01)
*B60R 13/06* (2006.01)

(52) U.S. Cl.
USPC .................. 296/203.03; 296/198; 296/193.06

(58) Field of Classification Search
USPC ................... 296/198, 193.06, 203.01, 203.03
See application file for complete search history.

(56) References Cited

U.S. PATENT DOCUMENTS 7,083,224 B2 * 8/2006 Yamamura et al. ........... 296/198

FOREIGN PATENT DOCUMENTS

| JP | 2-63981 | * | 3/1990 |
| JP | 11-20743 | * | 1/1999 |
| JP | 11-105640 | * | 4/1999 |
| JP | 2000-355255 | * | 12/2000 |
| JP | 2006-015834 A | | 1/2006 |
| JP | 2009-119992 A | | 6/2009 |
| JP | 2010-215114 | * | 9/2010 |

* cited by examiner

*Primary Examiner* — Dennis Pedder
(74) *Attorney, Agent, or Firm* — Westerman, Hattori, Daniels & Adrian, LLP (57) ABSTRACT A space between the trailing edge of a front fender and the outer surface of a front pillar lower in the vehicle width direction is covered with a synthetic resin enclosure inserted from the wheel housing side. The upper end of a main body of the enclosure is provided with an upper extending portion extending toward the lower end of the front pillar upper, and a reinforcing rib is formed on the outer surface of the upper extending portion so as to make the reinforcing rib in contact with the inner surface of a projecting portion of the front fender. A pressure applied to the projecting portion of the front fender is transmitted to the front pillar lower via the reinforcing rib, and thus the surface stiffness of the projecting portion of the front fender can be improved without adding a particular reinforcing member.

8 Claims, 10 Drawing Sheets

VEHICLE BODY STRUCTURE FOR AUTOMOBILE

CROSS REFERENCES TO RELATED APPLICATIONS

The present application claims priority under 35 U.S.C. §119 to Japanese Patent Application No. 2011-172442, filed Aug. 6, 2011, entitled "Vehicle Body Structure for Automobile." The contents of this application are incorporated herein by reference in their entirety.

TECHNICAL FIELD

The present disclosure relates to a vehicle body structure for an automobile in which a space formed between the trailing edge of a front fender and the outer surface of a front pillar lower in the vehicle width direction is covered with a synthetic resin enclosure which is inserted from the wheel housing side.

BACKGROUND

For example, a conventional vehicle body structure for an automobile is known as disclosed in Japanese Unexamined Patent Application Publication No. 2006-15834.

In the above disclosure, an enclosure extension forwardly extends from the front surface of the enclosure, and a fender panel surface reinforcement portion provided at the end of the enclosure extension is fixed along the inner surface of the fender panel in the vehicle width direction, and thus the surface stiffness of an upper portion of a wheel arch edge of the fender panel is improved.

SUMMARY

The upper portion of the trailing edge of the front fender projects upwardly rearward and is connected to the lower end of a front pillar upper. Because this projecting portion has a narrower width, it is difficult to provide a fixing portion for fixing the projecting portion to other vehicle body panels. For this reason, there has been a problem in that when a pressure is applied to the projecting portion of the front fender at the time of wiping off wax or washing the vehicle, the projecting portion can be bent inwardly, which may give erroneous impression that the stiffness seems to be lower, thereby reducing the marketability of the vehicle.

The present application has been made in light of the above-described situations in order to improve the stiffness of a portion connecting the front fender and the front pillar upper with a simple structure.

In order to provide such a vehicle structure, according to a first aspect of the embodiment, a vehicle body structure for automobile is proposed, in which a space between a trailing edge of a front fender and an outer surface in a vehicle width direction of a front pillar lower is closed with a synthetic resin enclosure inserted from a wheel housing side, wherein an upper end of a main body of the enclosure is provided with an upper extending portion which extends toward a lower end of a front pillar upper, and a reinforcing rib is formed on an outer surface of the upper extending portion in the vehicle width direction, the reinforcing rib being in contact with an inner surface of an rear upper portion of the front fender in the vehicle width direction. Thus, a pressure applied to the rear upper portion of the front fender is transmitted to the front pillar lower via the reinforcing rib of enclosure, and consequently the surface stiffness of the rear upper portion of the front fender can be improved without adding a particular reinforcing member.

According to a second aspect of the embodiment, in addition to the configuration of the first aspect of the embodiment, a vehicle body structure for automobile is proposed, in which a notch is provided between the main body of the enclosure and the upper extending portion so as to reduce stiffness. Thus, the enclosure, when being mounted on the vehicle body, can be placed in the mounting position by easily bending the upper extending portion with respect to the main body in the vehicle width direction.

According to a third aspect of the embodiment, in addition to the configurations of the first aspect of the embodiment, a vehicle body structure for automobile is proposed, in which the reinforcing rib extends within an H-plane from the upper extending portion outwardly in the vehicle width direction. Thus, when the enclosure is mounted on the vehicle body, bending of the upper extending portion in the vehicle width direction is not prevented by the reinforcing rib.

According to a fourth aspect of the embodiment, in addition to the configuration of the first aspect of the embodiment, a vehicle body structure for automobile is proposed, in which a trailing edge of the front fender is provided with an attachment bracket which projects in a T-plane, the enclosure is provided with an attachment piece in contact with a rear surface of the attachment bracket, the attachment piece being fixed with a clip and formed integrally with the enclosure so as to be swingable via a resin hinge. Thus, when the enclosure is moved from the front to the back to be mounted on the vehicle body, the attachment piece can be swung in a position which does not interfere with the attachment bracket, and by using a resin hinge, a separate hinge member is not needed, and thus the number of members is reduced.

According to a fifth aspect of the embodiment, in addition to the configuration of the fourth aspect of the embodiment, a vehicle body structure for automobile is proposed, in which the attachment piece includes a leg portion which is engaged with a jointed portion of the enclosure so that the attachment piece is allowed to be maintained in a backward swinging attitude. Thus, when the enclosure is mounted on the vehicle body, the attachment piece can be inserted through the attachment bracket of the front fender without supporting the attachment piece with a hand, thereby increasing the workability in mounting the enclosure.

According to a sixth aspect of the embodiment, in addition to the configuration of the first aspect of the embodiment, a vehicle body structure for automobile is proposed, in which the upper extending portion includes a lower wall portion which is disposed along the trailing edge of the front fender and faces in a rear downward direction, and an upper wall portion which is connected to an upper end of the lower wall portion and faces in a rear upward direction. Thus, the space formed between the trailing edge of the front fender and the outer surface of the front pillar lower in the vehicle width direction can be concealed even when viewed upward or downward from the back.

For example, the jointed portion may include, but not limited to, the opening 17c in the embodiment; the lower wall portion may include, but not limited to, the third wall 18b in the embodiment; and the upper wall portion may include, but not limited to, the fifth wall 18d in the embodiment.

BRIEF DESCRIPTION OF THE DRAWINGS

The advantages of the disclosure will become apparent in the following description taken in conjunction with the following drawings.

DETAILED DESCRIPTION

Hereinafter, a first embodiment of the present disclosure will be described with reference to FIGS. 1 to 7.

Figure 2:
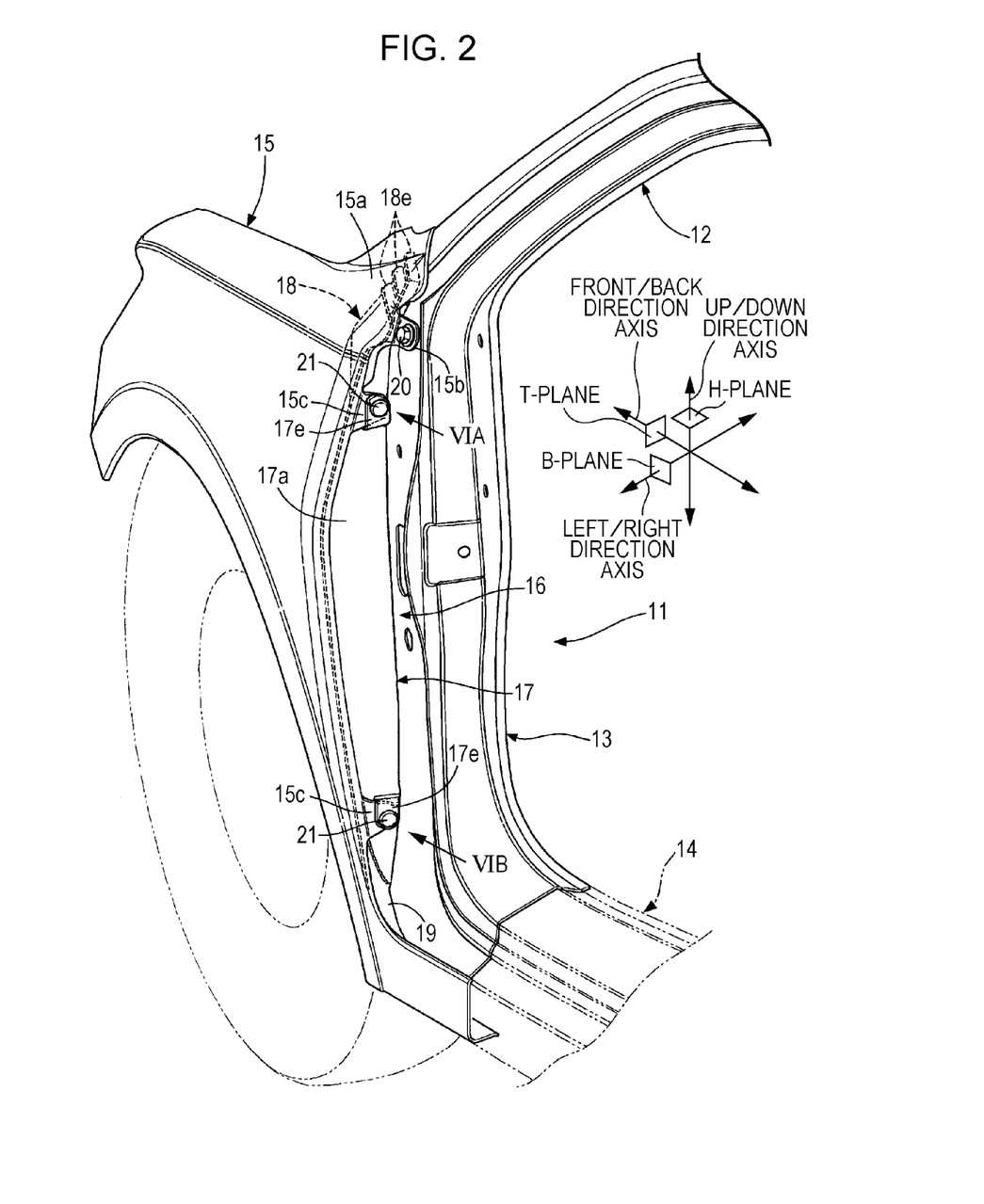
FIG. 2 is a view in the direction of an arrow II in FIG. 1 (the first embodiment).

First, the front/back direction, the horizontal direction (the vehicle width direction), and the vertical direction herein are defined with reference to a driver sitting on the driver seat. T-plane, B-plane, and H-plane herein are defined as follows. As illustrated in FIG. 2, the T-plane is a plane perpendicular to the front/back direction axis, and corresponds to, for example, the front surface of the vehicle body, and the rear surface of the vehicle body. The B-plane is a plane perpendicular to the horizontal direction axis, and corresponds to, for example, the left side surface of the vehicle body and the right side surface of the vehicle body. The H-plane is a plane perpendicular to the vertical direction axis, and corresponds to, for example, the ceiling surface of the vehicle body and the floor surface of the vehicle body. However, the definition of the T-plane shall include a plane which is inclined at an angle less than 45° with respect to a plane perpendicular to the front/back direction axis; the definition of the B-plane shall include a plane which is inclined at an angle less than 45° with respect to a plane perpendicular to the horizontal direction axis; and the definition of the H-plane shall include a plane which is inclined at an angle less than 45° with respect to a plane perpendicular to the vertical direction axis.

Figure 1:
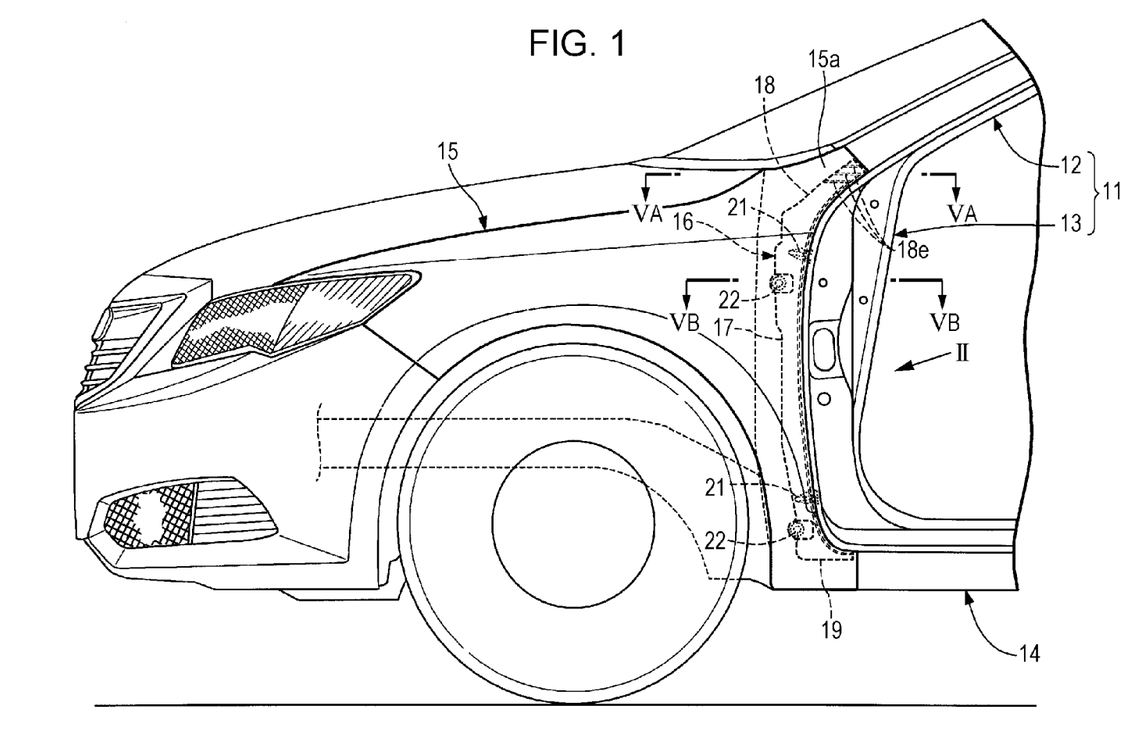
FIG. 1 is a side view of the front body portion of an automobile (a first embodiment).

As illustrated in FIGS. 1 and 2, a front pillar 11 includes a front pillar upper 12 which extends forwardly downward from a roof, and a front pillar lower 13 which extends downward from the front end of the front pillar upper 12 to be connected to the front end of a side sill 14. The trailing edge of a front fender 15 overlaps the outside of the front pillar lower 13 in the vehicle width direction, and a projecting portion 15a extending rearward and upward from the upper end of the trailing edge of the front fender 15 is connected to the lower end of the front pillar upper 12. A space formed between the trailing edge of the front fender 15 and the outer surface of the front pillar lower 13 in the vehicle width direction is covered by a flexible enclosure 16 composed of a synthetic resin, thus the enclosure 16 prevents the inside of the front fender 15 from being viewed through the space, and consequently the aesthetic appearance of the vehicle can be improved.

Figure 3:
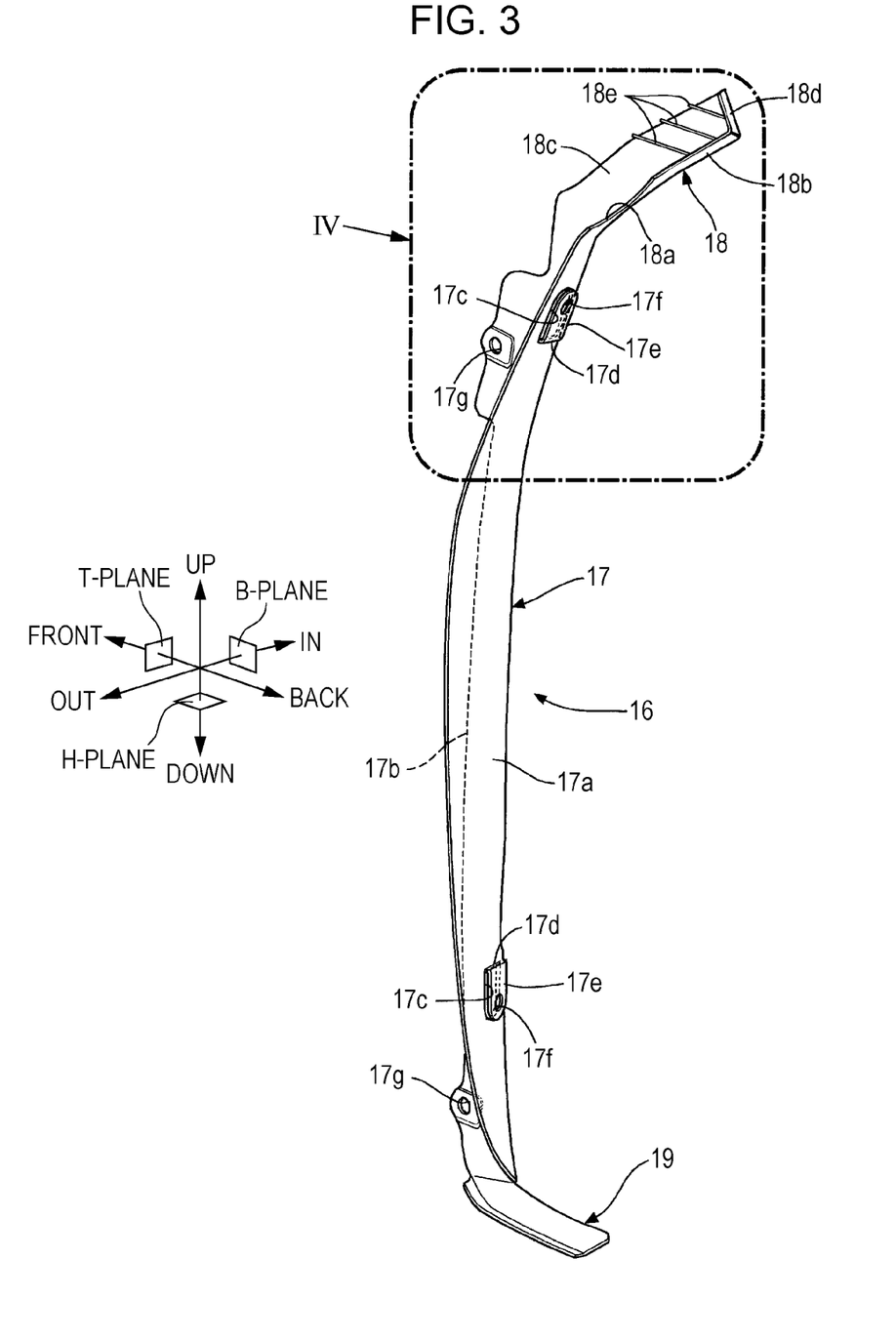
FIG. 3 is a perspective view of an enclosure (the first embodiment).
Figure 4:
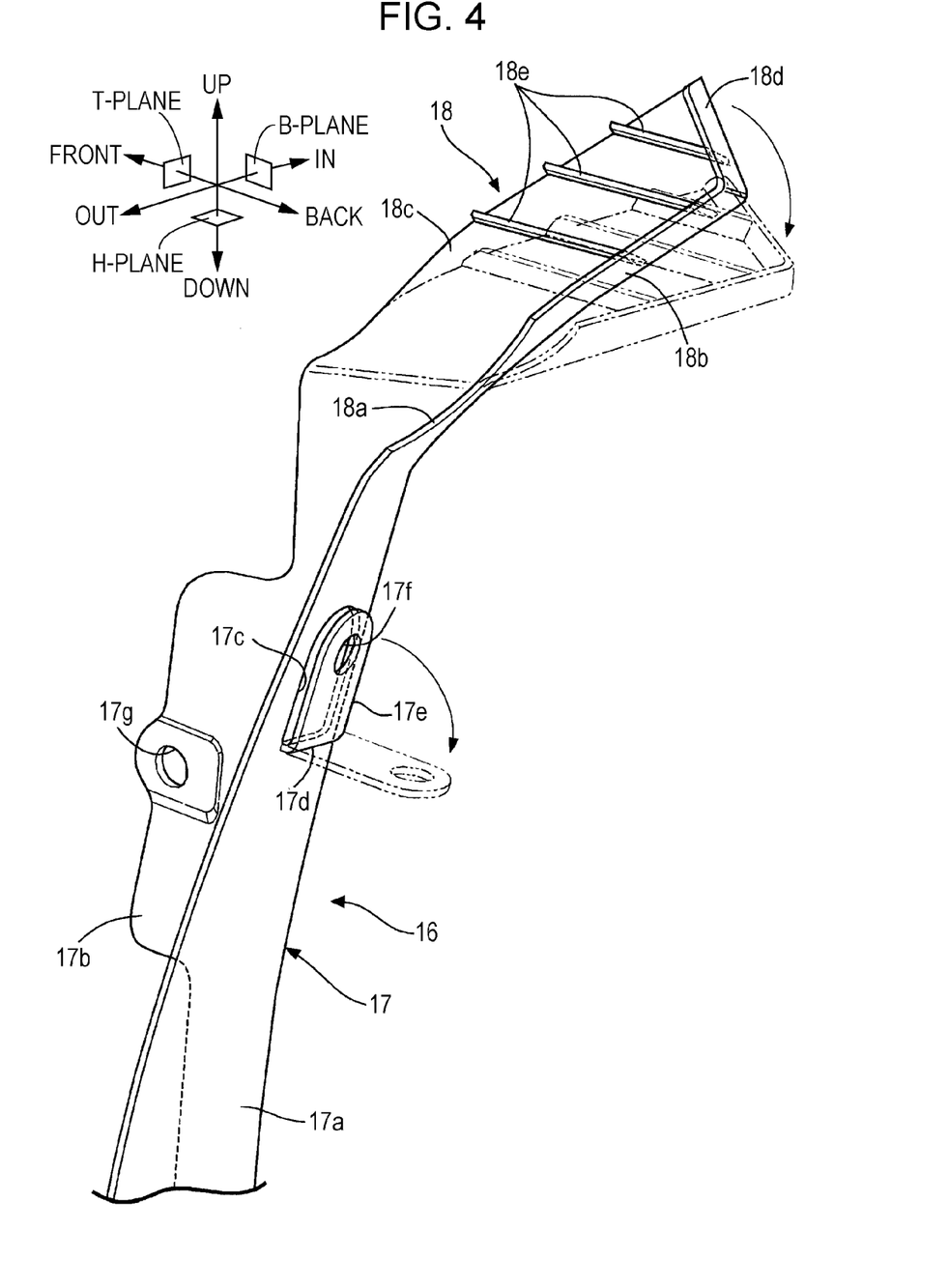
FIG. 4 is an enlarged view of FIG. 3 (the first embodiment).

As illustrated in FIGS. 3 and 4, the enclosure 16 includes a main body 17 which is located in the middle in the vertical direction; an upper extending portion 18 which is connected to the upper end of the main body 17 and extends rearward and upward; and a rearward extending portion 19 which is connected to the lower end of the main body 17 and extends rearward.

The main body 17 has an L-shaped cross-section along a H-plane, and includes a first wall 17a which is disposed in a T-plane and closes the space between the front fender 15 and the front pillar lower 13, and a second wall 17b which extends forward in a B-plane from the inner edge of the first wall 17a in the vehicle width direction. An upper portion of the first wall 17a is provided with an inverted U-shaped attachment piece 17e which is connected via a resin hinge 17d to the lower edge of an inverted U-shaped opening 17c, and a clip hole 17f is formed in the attachment piece 17e. Similarly, a lower portion of the first wall 17a is provided with a U-shaped attachment piece 17e which is connected via a resin hinge 17d to the upper edge of a U-shaped opening 17c, and a clip hole 17f is formed in the attachment piece 17e.

The resin hinge 17d is obtained by bending the raw material of the enclosure 16, i.e., the synthetic resin itself, and serves as a hinge, thus a separate hinge member is not needed, and therefore the number of members is reduced and cost reduction can be achieved.

A vertical pair of clip holes 17g, 17g are formed in the second wall 17b of the main body 17 of the enclosure 16.

The upper extending portion 18 includes a third wall 18b which is connected via a circular notch 18a to an upper portion of the first wall 17a of the main body 17, a fourth wall 18c which is connected to the upper portion of the second wall 17b of the main body 17, and a fifth wall 18d which is connected to the third wall 18b and the fourth wall 18c. The third wall 18b extends from a forward lower position to a rearward upper position in a T-plane or an H-plane, and the fifth wall 18d extends from a rearward lower position to a forward upper position in a T-plane or an H-plane. The fourth wall 18c is disposed in the same B-plane as the second wall 17b of the main body 17.

In the fourth wall 18c, a plurality (three in the present embodiment) of parallel reinforcing ribs 18e disposed in an H-plane are provided projecting outwardly in the vehicle width direction. The rear ends of the reinforcing ribs 18e are connected to the third wall 18b or the fifth wall 18d, and the outer ends of the reinforcing ribs 18e in the vehicle width direction are in contact with the inner surface of the projecting portion 15a (see FIGS. 1 and 2) of the front fender 15 in the vehicle width direction.

A rear extending portion 19 is bent at 90° from the lower end of the second wall 17b of the main body 17, and extends rearward in a H-plane.

Figure 7A:
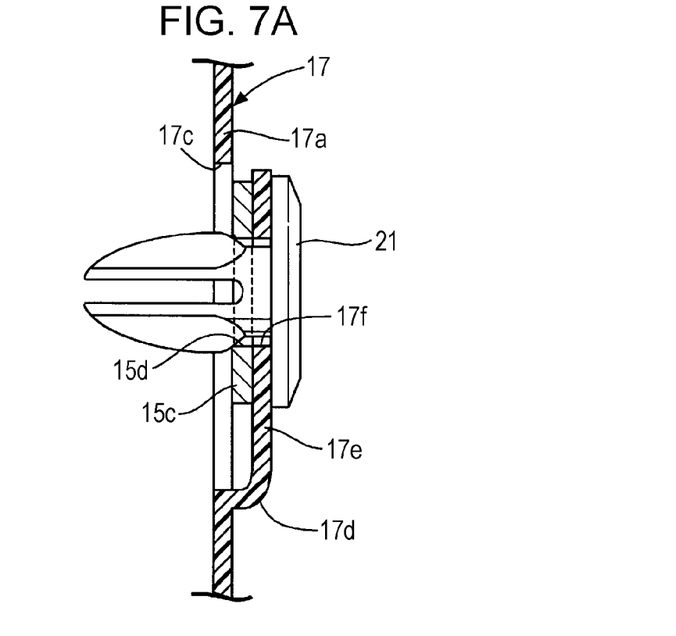
FIG. 7A is a cross-sectional view taken along a line VIIA-VIIA in FIG. 6A when attachment is completed.
Figure 7B:
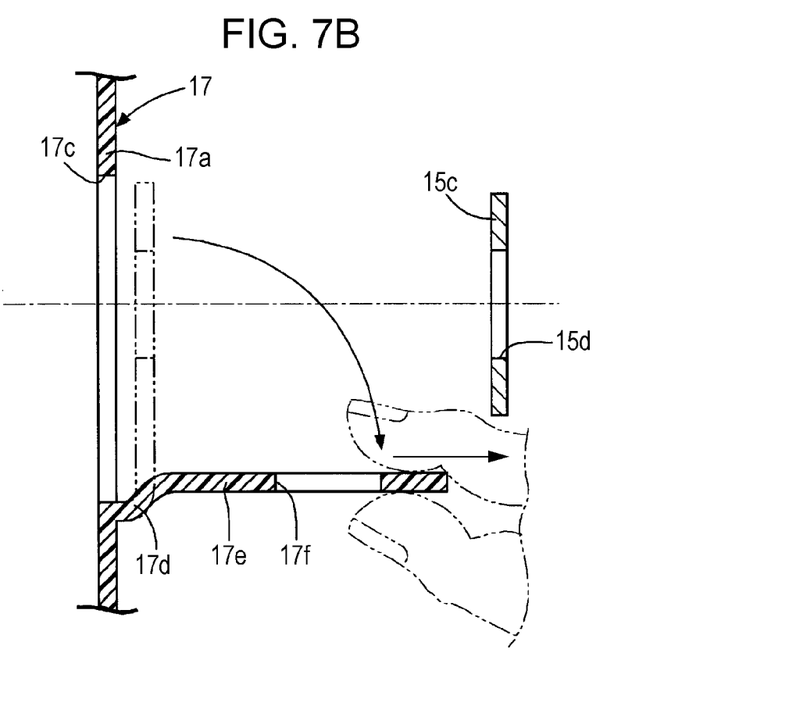
FIG. 7B is a cross-sectional view taken along a line VIIA-VIIA in FIG. 6A when attachment is started. (the first embodiment).

As illustrated in FIG. 2, a tongue-shaped joining portion 15b located in a B-plane projects rearward in the upper portion of the trailing edge of the front fender 15, a vertical pair of attachment brackets 15c, 15c located in a T-plane project inwardly in the vehicle width direction in the lower portion of the joining portion 15b, and clip holes 15d, 15d (see FIG. 7) are formed in the attachment brackets 15c, 15c.

Next, attachment of the enclosure 16 having the above-described configuration is described.

The front fender 15 is fixed via a joining portion 15b with a bolt 20 to the outer surface of the front pillar lower 13 in the vehicle width direction (see FIG. 2), and is fixed to the vehicle body via a plurality of other joining portions (not shown). In this state, a space is formed between the trailing edge of the front fender 15 and the outer surface of the front pillar lower 13 in the vehicle width direction. However, the space is covered with the flexible enclosure 16 made of a synthetic resin.

The enclosure 16 is inserted rearward to the attachment position from the space of the wheelhouse of the front fender 15. Because the lower portion of the front pillar upper 12 is inclined inward in the vehicle width direction with respect to the upper portion of the front pillar lower 13, when the enclosure 16 which is located inward in the vehicle width direction of the projecting portion 15a of the upper end of the front fender 15 is in an attached state, the upper extending portion 18 is inclined inward in the vehicle width direction with respect to the main body 17.

Therefore, in the process of rearwardly inserting the enclosure 16 to the attachment position from the wheelhouse, the upper extending portion 18 of the enclosure 16 is pressed against the inner surface of the front fender 15 in the vehicle width direction so as to be bent inwardly in the vehicle width direction and thus is properly housed in the attachment position. In this process, the upper extending portion 18 can be smoothly bent inward in the vehicle width direction because the lower end of the third wall 18b of the upper extending portion 18 is provided with the notch 18a.

Figure 6A:
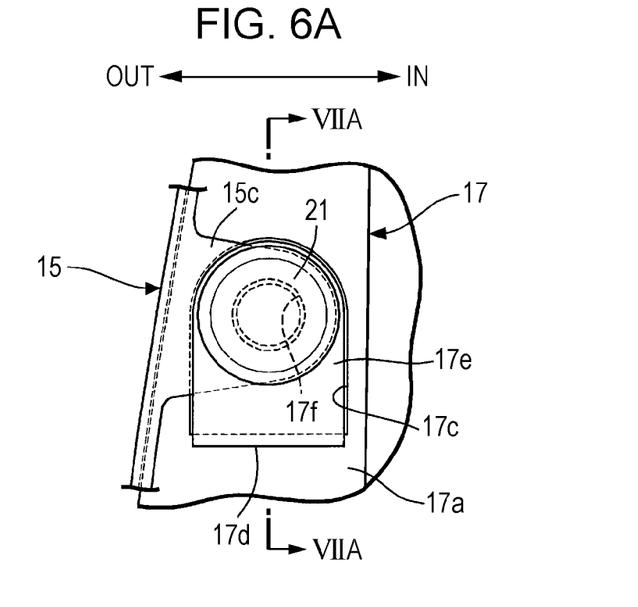
FIG. 6A is a view in the direction of an arrow VIA in FIG. 2 (the first embodiment).
Figure 6B:
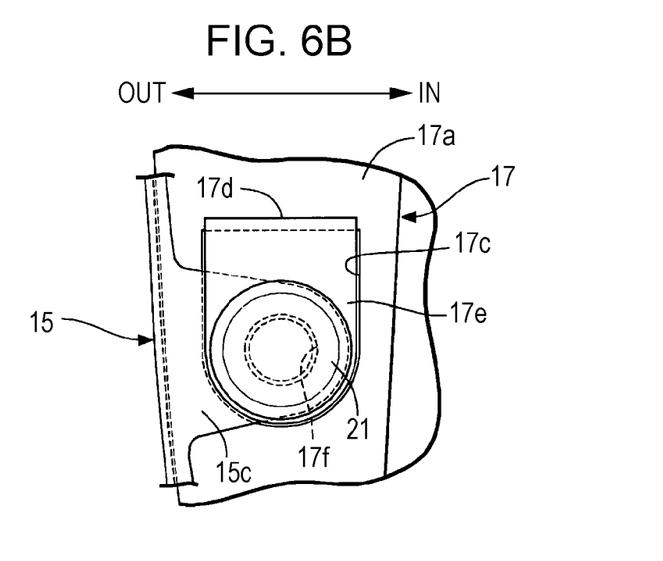
FIG. 6B is a view in the direction of an arrow VIB in FIG. 2 (the first embodiment).

As illustrated in FIG. 7B, vertical attachment pieces 17e of the first wall 17a are each bent forward by hand around the resin hinge 17d immediately before the enclosure 16 reaches the attachment position, and the enclosure 16 is moved to the attachment position in this state so that the attachment piece 17e is turned behind the attachment bracket 15c of the front fender 15. Then when the attachment piece 17e is released, the resin hinge 17d returns to the original position because of its elasticity and overlaps with the rear surface of the attachment bracket 15c of the front fender 15 as illustrated in FIG. 6 and FIG. 7A. Then, a clip 21 is inserted from the rear through each of the clip hole 17f of the attachment piece 17e and the clip hole 15d of the attachment bracket 15c and is fixed.

Figure 5A:
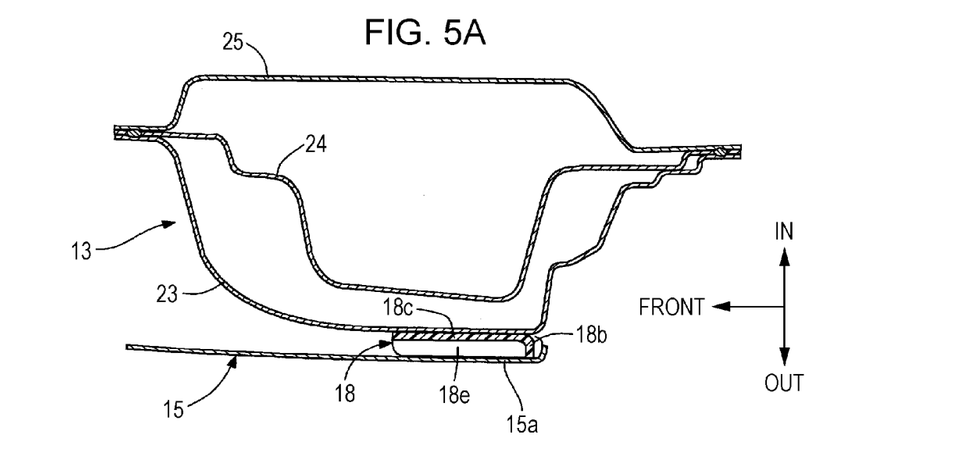
FIG. 5A is a cross-sectional view taken along a line VA-VA in FIG. 1 (the first embodiment).
Figure 5B:
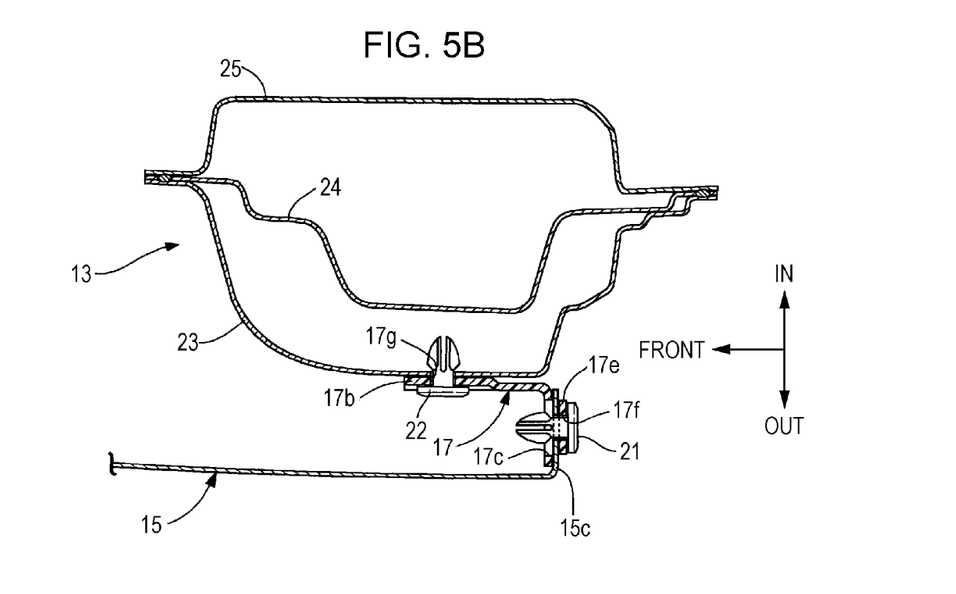
FIG. 5B is a cross-sectional view taken along a line VB-VB in FIG. 1 (the first embodiment).

In addition, as illustrated in FIG. 5B, a clip 22 is inserted from the outside to the inside in the vehicle width direction through each of the clip holes 17g above and below the second wall 17B of the main body 17 of the enclosure 1, and is fixed to the outer surface of the front pillar lower 13 in the vehicle width direction. Consequently, the enclosure 16 is fixed to the front fender 15 and the front pillar lower 13 with the clip 21 and the clip 22. As illustrated in FIG. 5B, the front pillar lower 13 is formed as a closed section by bonding an outer member 23, a stiffener 24, and an inner member 25 together.

In a state where the enclosure 16 is attached in the above manner, the space formed between the trailing edge of the front fender 15 and the outer surface of the front pillar lower 13 in the vehicle width direction is covered with the first wall 17a of the main body 17 of the enclosure 16, the third wall 18b of the upper extending portion 18, and the fifth wall 18d of upper extending portion 18. At this point, the fifth wall 18d of the upper extending portion 18 is disposed inclined from a rearward lower position to a forward upper position, and thus, a view in the rear upward direction also can be blocked by the fifth wall 18d.

Because the projecting portion 15a (see FIGS. 1 and 2) of the upper end of the front fender 15 is not joined to the vehicle body conventionally, there is a problem in that when a pressure is applied at the time of wiping off wax or washing the vehicle, the projecting portion 15a can be bent inwardly, which may give erroneous impression that its stiffness seems to be lower. However, according to the present embodiment, as illustrated in FIG. 5A, the reinforcing ribs 18e provided in the upper extending portion 18 of the enclosure 16 are in contact with the inner surface of the projecting portion 15a of the front fender 15 in the vehicle width direction, thus the stiffness of the projecting portion 15a is improved and the above-described problem may be solved. Because the enclosure 16 is provided with the reinforcing ribs 18e in this manner, compared with the case where a particular member is added, the number of members and the cost may be reduced.

The reinforcing ribs 18e of the upper extending portion 18 of the enclosure 16 are disposed in an H-plane and project outwardly in the vehicle width direction, thus when the upper extending portion 18 of the enclosure 16 is pressed against the inner surface of the front fender 15 in the vehicle width direction so as to be bent inwardly in the vehicle width direction in the process of rearwardly inserting the enclosure 16 to the attachment position from the wheelhouse, the reinforcing ribs 18e do not reduce the stiffness of the upper extending portion 18.

Figure 8:
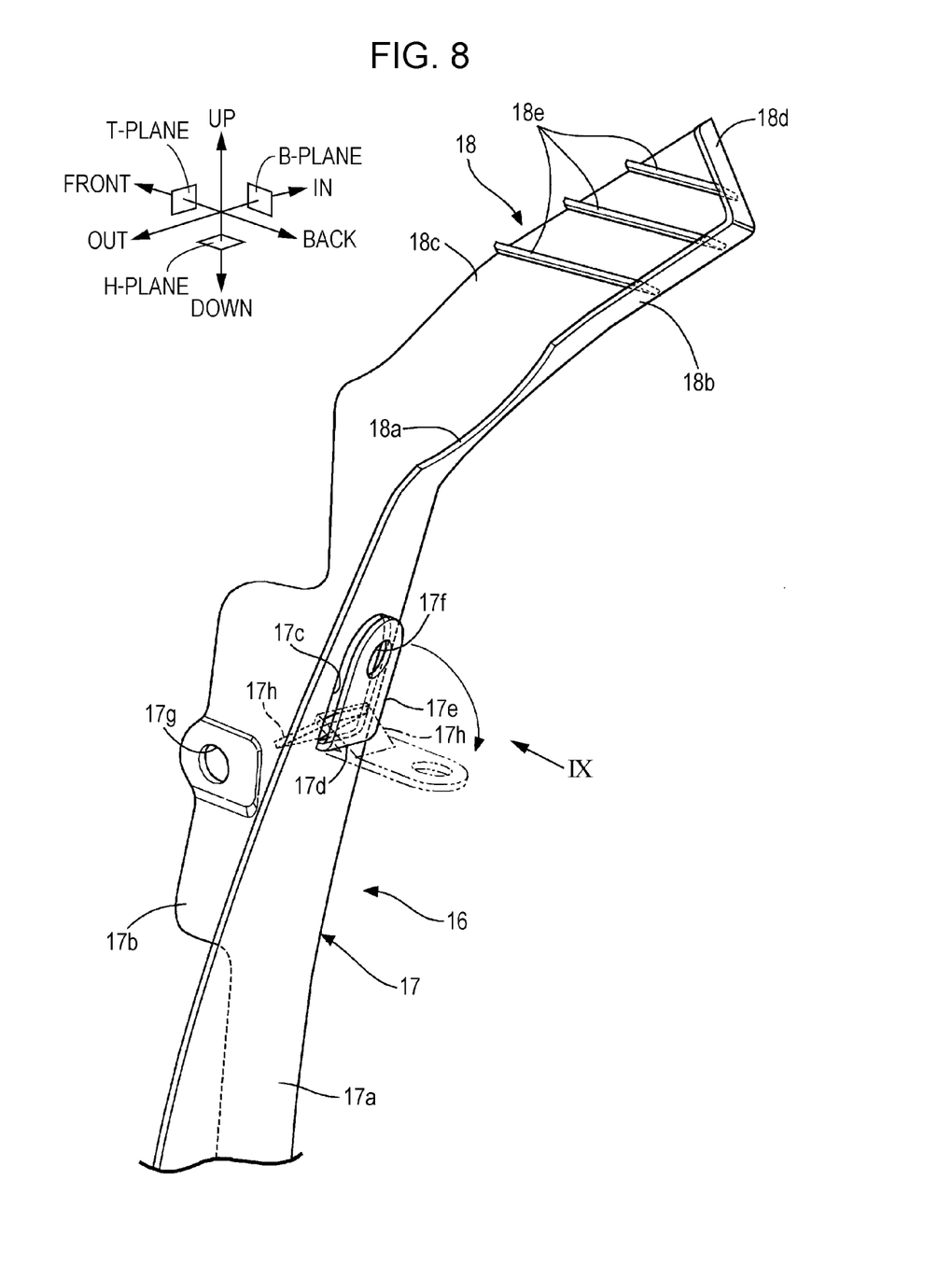
FIG. 8 is a view corresponding to FIG. 3 (a second embodiment).
Figure 9:
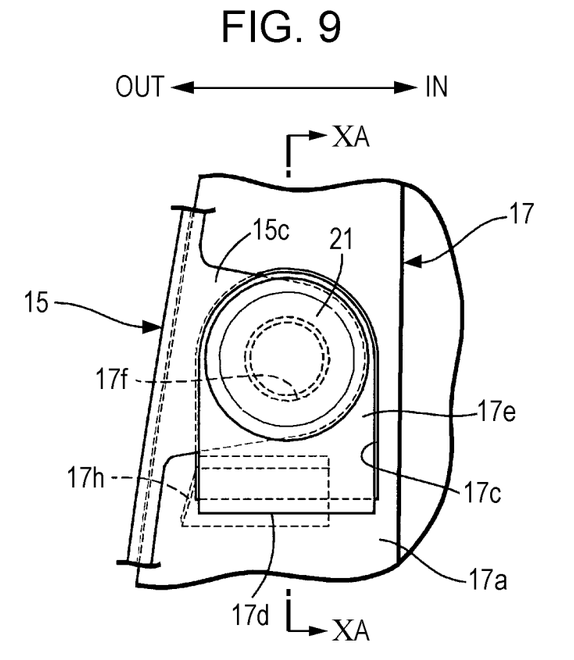
FIG. 9 is a view in the direction of an arrow IX in FIG. 8 (the second embodiment).
Figure 10A:
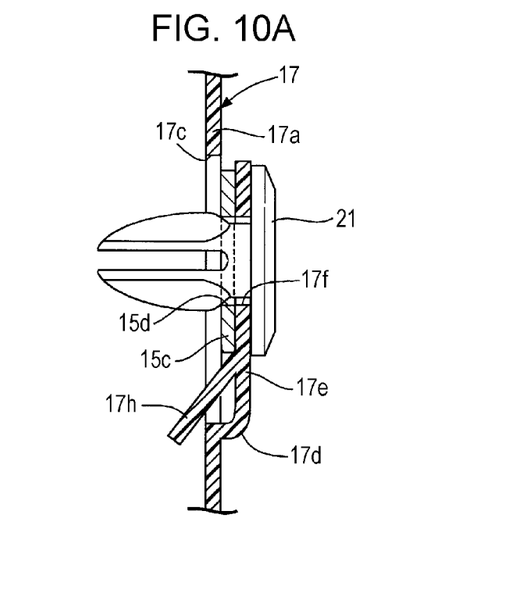
FIG. 10A is a cross-sectional view taken along a line XA-XA in FIG. 9 when attachment is completed.
Figure 10B:
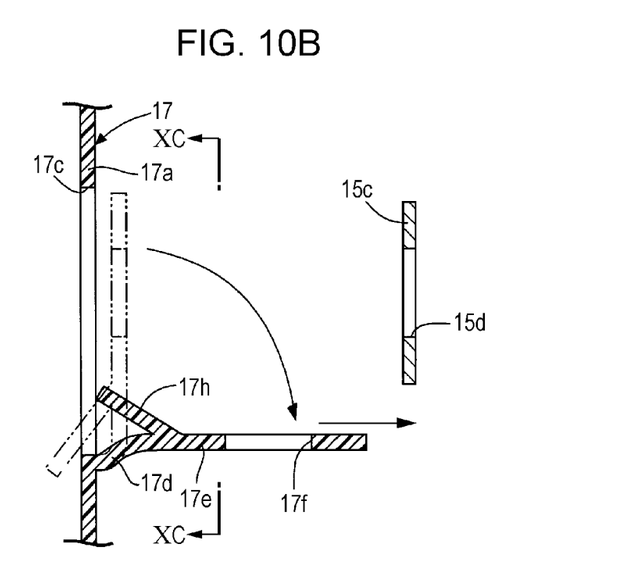
FIG. 10B is a cross-sectional view taken along a line XA-XA in FIG. 9 when attachment is started.
Figure 10C:
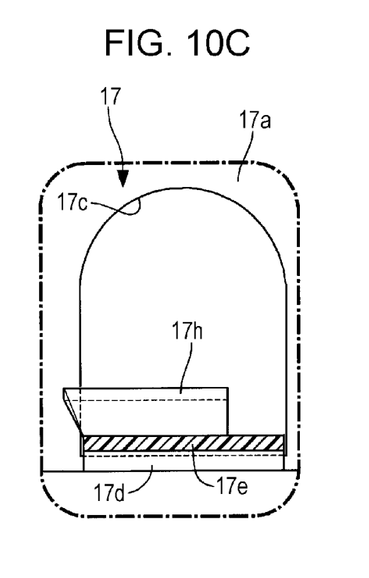
FIG. 10C is a top view of an attachment piece when attachment is started. (the second embodiment).

Next, a second embodiment of the present disclosure will be described with reference to FIGS. 8 to 10.

In the second embodiment, the attachment piece 17e for fixing the enclosure 16 to the attachment bracket 15c of the front fender 15 includes a leg 17h which projects forward, and the rest of the configuration is the same as that of the first embodiment.

Before the enclosure 16 is attached to the vehicle body, the attachment piece 17e is swung backward around each of the resin hinges 17d, 17d and is passed through the opening 17c, and then the end of leg portion 17h is latched at the edge of the opening 17c so as to maintain the swinging attitude. Accordingly, in the process of rearwardly inserting the enclosure 16 to the attachment position from the wheelhouse, the attachment bracket 15c of the front fender 15 can be passed through from the front to the rear without holding the attachment piece 17e with a hand to maintain the swinging attitude, thus the workability improves significantly.

Then after the attachment piece 17e is passed through the attachment bracket 15c from the front to the rear, the attachment piece 17e can return to the original posture because of its elasticity by simply releasing the latching between the leg portion 17h and the opening 17c.

In the above, the embodiments of the present disclosure have been described, however, in a range not departing from the spirit of the present disclosure, various design changes may be made.

For example, the number of the reinforcing ribs 17e of the enclosure 16 is not limited to three in the present embodiment.

We claim:
1. A vehicle body structure for an automobile comprising:
an enclosure inserted from a wheel housing side of a front fender into a space between a trailing edge of the front fender and an outer surface in a vehicle width direction of a front pillar so as to cover the space,
wherein the enclosure includes a main body and an upper extending portion provided at an upper end of the main body, the upper extending portion extending toward a lower end of a front pillar upper,
wherein the upper extending portion includes a reinforcing rib formed on an outer surface thereof in the vehicle width direction, the reinforcing rib being in contact with an inner surface of a rear upper portion of the front fender in the vehicle width direction, wherein the trailing edge of the front fender includes an attachment bracket projecting in a T-plane, wherein the enclosure includes an attachment piece being in contact with a rear surface of the attachment bracket and fixed with a clip, wherein the enclosure is made of a synthetic resin, and wherein the attachment piece is formed integrally with the enclosure so as to be swingable via a resin hinge.

2. The vehicle body structure for automobile according to claim 1, wherein the enclosure includes a notch provided between the main body and the upper extending portion so as to reduce stiffness of the enclosure.

3. The vehicle body structure for automobile according to claim 1, wherein the reinforcing rib extends in an H-plane from the upper extending portion outwardly in the vehicle width direction.

4. The vehicle body structure for automobile according to claim 1, wherein the attachment piece includes a leg portion engageable with a jointed portion of the enclosure so as to maintain the attachment piece in a backward swung position.

5. The vehicle body structure for automobile according to claim 1, wherein the upper extending portion includes a lower wall portion disposed along the trailing edge of the front fender and facing in a rear downward direction, and an upper wall portion connected to an upper end of the lower wall portion and facing in a rear upward direction.

6. The vehicle body structure for automobile according to claim 2, wherein the notch is provided on an outer side of the enclosure in the vehicle width direction.

7. A vehicle body structure for an automobile comprising:

an enclosure inserted from a wheel housing side of a front fender into a space between a trailing edge of the front fender and an outer surface in a vehicle width direction of a front pillar so as to cover the space, wherein the enclosure includes a main body and an upper extending portion provided at an upper end of the main body, the upper extending portion extending toward a lower end of a front pillar upper, wherein the upper extending portion includes a reinforcing rib formed on an outer surface thereof in the vehicle width direction, the reinforcing rib being in contact with an inner surface of a rear upper portion of the front fender in the vehicle width direction, and wherein the reinforcing rib extends in an H-plane from the upper extending portion outwardly in the vehicle width direction.

8. A vehicle body structure for an automobile comprising:

an enclosure inserted from a wheel housing side of a front fender into a space between a trailing edge of the front fender and an outer surface in a vehicle width direction of a front pillar so as to cover the space, wherein the enclosure includes a main body and an upper extending portion provided at an upper end of the main body, the upper extending portion extending toward a lower end of a front pillar upper, wherein the upper extending portion includes a reinforcing rib formed on an outer surface thereof in the vehicle width direction, the reinforcing rib being in contact with an inner surface of a rear upper portion of the front fender in the vehicle width direction, and wherein the upper extending portion includes a lower wall portion disposed along the trailing edge of the front fender and facing in a rear downward direction, and an upper wall portion connected to an upper end of the lower wall portion and facing in a rear upward direction.

* * * * *